United States Patent
Fletcher et al.

(10) Patent No.: US 9,824,312 B2
(45) Date of Patent: Nov. 21, 2017

(54) DOMAIN SPECIFIC LANGUAGES AND COMPLEX EVENT HANDLING FOR MOBILE HEALTH MACHINE INTELLIGENCE SYSTEMS

(71) Applicant: Voalte, Inc., Sarasota, FL (US)

(72) Inventors: Donnie C. Fletcher, Sarasota, FL (US); Trevor J. Brown, Sarasota, FL (US)

(73) Assignee: Voalte, Inc., Sarasota, FL (US)

( * ) Notice: Subject to any disclaimer, the term of this patent is extended or adjusted under 35 U.S.C. 154(b) by 0 days.

(21) Appl. No.: 14/735,219

(22) Filed: Jun. 10, 2015

(65) Prior Publication Data
US 2016/0364650 A1    Dec. 15, 2016

(51) Int. Cl.
G06N 5/04    (2006.01)

(52) U.S. Cl.
CPC .................... G06N 5/046 (2013.01)

(58) Field of Classification Search
CPC ....................................... G06N 5/047
USPC .......................................... 706/47
See application file for complete search history.

(56) References Cited

PUBLICATIONS

Costa et al ("Evaluation of a Rule-Based Approach for Context-Aware Services" 2008).*
Han et al ("Managing Exceptions in the Medical Workflow Systems" 2006).*
Han et al ("Semantic Context-Aware Service Composition for Building Automation System" Mar. 2013).*
William N. Robinson ("Implementing Rule-based Monitors within a Framework for Continuous Requirements Monitoring" 2005).*

* cited by examiner

*Primary Examiner* — Lut Wong
(74) *Attorney, Agent, or Firm* — Long Technology Law, LLC; Joseph L. Long (57) ABSTRACT

Systems and methods can support complex event handling. A complex event handler can receive a current event. The current event may be stored to an event log. The current event may be matched against rule conditions within a rule implementation system. Prior events may be identified, within the rule implementation system, upon which the matched rule conditions also depend. The event log may be searched for the identified prior events. Prior event parameters, corresponding to the identified prior events, may be retrieved from the event log. The rule conditions may be evaluated in view of the current event and the retrieved prior event parameters. Actions may be executed that correspond to the rule conditions triggered in response to the evaluating. Domain specific language expression may be received, processed, and incorporated as rules and facts into the rule implementation system.

20 Claims, 5 Drawing Sheets

DOMAIN SPECIFIC LANGUAGES AND COMPLEX EVENT HANDLING FOR MOBILE HEALTH MACHINE INTELLIGENCE SYSTEMS

BACKGROUND

Complex events, such as those encountered within healthcare enterprises, may be defined as sequences of events in time that are dynamically coupled together through explicit or implied relationships and interdependencies. The implied interdependencies may be subtle and may exist through multiple layers of indirection. Evaluating automated rules upon such complex event conditions is generally extremely challenging. When the combined events and time sequences making up the complex events are subtly related or when their relationships depend upon multiple layers of indirection, the challenges increase significantly, effectively becoming intractable to traditional approaches.

Data associated with complex events may be weakly structured or even unstructured. Such datasets often attempt to aggregate frequently changing information from many diverse sources having different structures and formats. Operating rules associated with such data may also be complex and highly dynamic.

There are numerous challenges to implementing intelligent rule systems to handle complex events that may be made up of loosely interrelated time sequences of events that each may involve complex datasets of information and their associated production rules.

There is a need in the art for complex event handling technology that can safely and efficiently support very large, unstructured datasets of interrelated sequences of occurrences, each of which may involve numerous parameters, the values and relationships of which may frequently change in real time. Such solutions would be particularly applicable in large, information-driven enterprises such as healthcare facilities or systems thereof.

SUMMARY

In certain example embodiments described herein, methods and systems can support complex event handling. A complex event handler can receive a current event. The current event may be stored to an event log. The current event may be matched against rule conditions within a rule implementation system. Prior events may be identified, within the rule implementation system, upon which the matched rule conditions also depend. The event log may be searched for the identified prior events. Prior event parameters, corresponding to the identified prior events, may be retrieved from the event log. The rule conditions may be evaluated in view of the current event and the retrieved prior event parameters. Actions may be executed that correspond to the rule conditions triggered in response to the evaluating. Domain specific language expression may be received, processed, and incorporated as rules and facts into the rule implementation system.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable efficient complex event handling. The complex event handler can leverage a rule engine or rule implementation system. The rule implementation system can operate directly within, or in conjunction with, a graph database system. Events may be stored to an event log of prior events. Certain prior events may be retrieved from the event log when evaluating newly received events. Rule conditions associated with the complex event handler may be evaluated in view of the newly received events as well as prior events retrieved form the event log. Actions may be executed when the rule conditions are appropriately triggered. Domain specific language expression may be received, processed, and incorporated as rules and facts into the rule implementation system. The events, actions, and domain specific language expressions may be associated with various communication occurrences within a healthcare enterprise. Examples of such communication occurrences may include messaging, alarms, voice calls, staff responsibility changes, and so forth.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
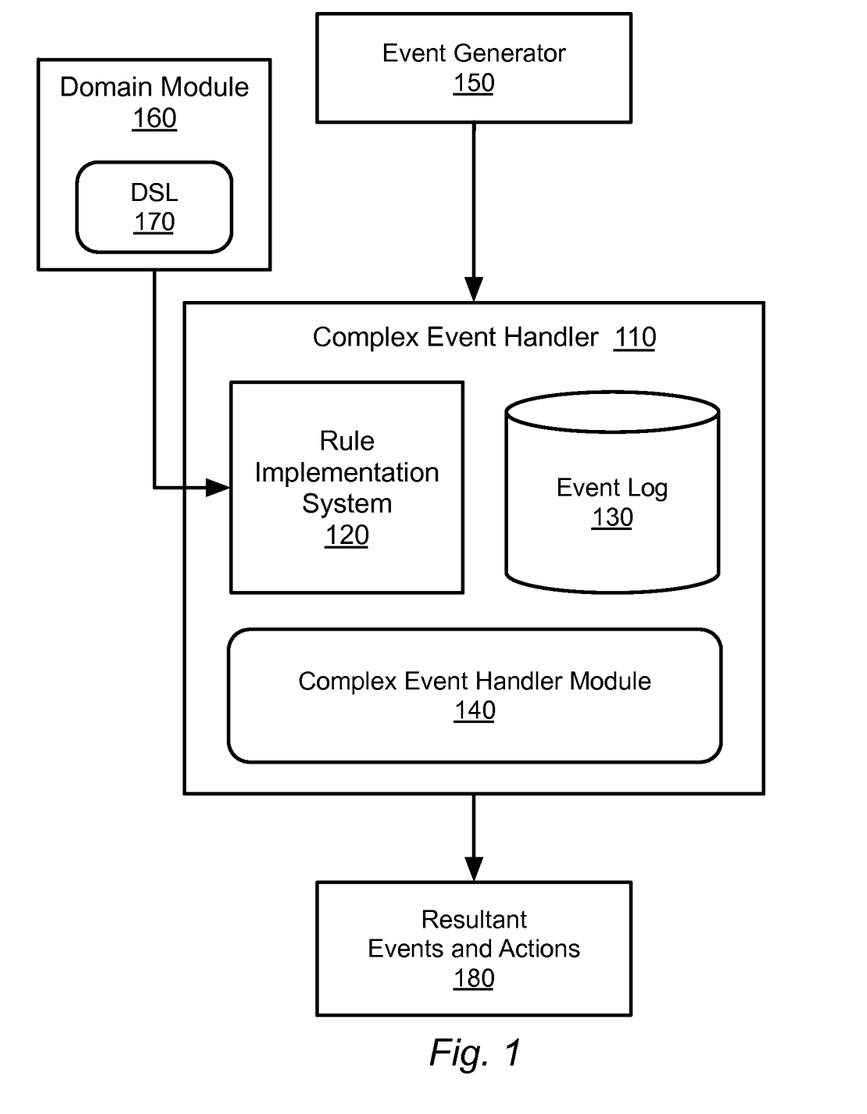
FIG. 1 is a block diagram depicting a complex event handler associated with a rule implementation system and an event log in accordance with one or more embodiments presented herein.

FIG. 1 is a block diagram depicting a complex event handler 110 associated with a rule implementation system 120 and an event log 130 in accordance with one or more embodiments presented herein. The complex event handler 110 can execute in association with a complex event handler module 140. The complex event handler 110 can receive incoming events from one or more event generators 150. The complex event handler 110 can store incoming events to the event log 130. The complex event handler 110 can match incoming events against rules within the rule implementation system 120. Triggering of the rules within the rule implementation system 120 may also be dependent upon prior events stored in the event log 130. Triggering of rules can generate resultant events and actions 180. One or more domain modules 160 may provide rules for use within the rule implementation system 120. A domain specific language (DSL) 170 may be used in conjunction with each of the domain modules 160.

The complex event handler 110 and associated complex event handler module 140 can receive incoming events from one or more event generators 150. The complex event handler 110 can support making decisions based one or more incoming current in combination with one or more prior events. The decisions may be determined by the rule implementation system 120 based upon incoming events along with prior events stored within the event log 130. In addition to the rule implementation system 120 triggering rules based upon incoming events, rules associated with the complex event handler 110 may further depend upon prior events retrieved form the event log 130. The condition of such a rule may be a function of both current incoming events as well as prior events.

According to one or more examples related to an enterprise messaging system, a current event may be generated when user Adam sends a first message to user Beth, both within the same organization. The complex event handler 110 may store, within the event log 130, an event indicating that the first message was sent. Subsequently, user Beth's role within the organization may change. For example, Beth may have been in charge of deliveries on the day when the first message was sent, but is now in charge of customer service. The change in Beth's role may generate an event that may be stored by the complex event handler 110 into the event log 130. At a future time, user Adam may send a second message to user Beth. Sending the message may generate an event, which is received by the complex event handler 110. The complex event handler 110 may trigger a rule within the rule implementation system 120. The complex rule may be a function of both the incoming event (a second message was sent) and two prior events (a first message was sent and the role associated with the receiver has changed). The two prior events may be retrieved from the event log 130 by the rule implementation system 120 while testing the rule. The rule may indicate that if user Adam sends a first message to user Beth, user Beth's role changes, and then user Adam sends a second message to user Beth, one or more actions should alert one or both of the users Adam and Beth to these details. For example, the rule implementation system 120 may generate an action to notify user Adam that user Beth has changed roles within the organization since their last interaction. The rule implementation system 120 may also generate an action to notify user Beth that user Adam sent a message and has been notified of Beth's new role. User Beth may also be provided the opportunity to redirect the second message to the new person in her prior role, if appropriate. Furthermore, user Beth may be provided with an option to ignore the message or to simply continue the conversation with user Adam.

It should be appreciated that rules associated with the complex event handler 110 can act on multiple incoming current events from multiple sources as well as depending upon multiple prior events retrieved form the event log 130. A rule may be a function of any number of incoming current events and any number of prior events.

The rule implementation system 120 may be an example of a rule engine system, production system, or production rule system. These are often used in artificial intelligence, automated planning, expert systems, action selection systems, or other such machine-based knowledge or decision systems.

The rule implementation system 120 may implement a plurality of rules. Each rule may contain a condition that when matched triggers a resultant action. The rule implementation system 120 may receive events that can be pattern-matched against the rule conditions. When a rule condition is properly matched to incoming events and/or stored prior events, the rule action associated with the condition may be triggered. The rule condition may be specifically formatted to match the formatting of the event data associated with incoming events and/or prior events stored within the event log 130. According to various embodiments, the rule implementation system 120 may be based upon a graph database.

The event log 130 can store events received by the complex event handler 110. The event log 130 can store events within a computerized database, a computer memory, a computer data storage system, a cloud-based data store, any other data storage mechanisms, or any combinations thereof. Each events may be time-stamped and/or date-stamped in order to establish when the complex event handler 110 received each events. According to various embodiments, stored prior events may be removed from the event log 130 when they reach a specified expiration date. Similarly, a rule may trigger indicating removal of an event entry from the event log 130. A given rule may also indicate a specified time window of prior events to be considered when evaluating the condition of the rule.

The resultant events and actions 180 may be generated as a result of triggering rules within the rule implementation system 120 in association with the complex event handler 110. When incoming and/or stored events match the patterns of a rule condition within the rule implementation system 120, that rule may be triggered generating an action. The action may include the generation of, or cause the generation of, a new event. The complex event handler 110 may again process that new event, which may include storing the event in the event log 130 and/or trigger rules within the rule implementation system 120 that match the new event. The actions may also impact or instruct operations of one or more other systems.

The event generator 150 may generally be any source of events that may be processed by the complex event handler 110. One example event generator 150 according to an example enterprise messaging system may be the transmission of a message from one user to another user. Another example event generator 150 according to an example healthcare enterprise system may the generation of a notification to a member of the nursing staff when an alarm is generated by a piece of patient instrumentation.

A domain specific language 170 may be specified for use within a particular knowledge domain. Examples of knowledge domains in a healthcare context may include pharmacy, nursing, radiology, cardiology, and so forth. The domain specific language 170 may be used in conjunction with one or more of the domain modules 160 to support specifying rules for use within the rule implementation system 120. Domain users and/or domain experts may provide rules expressed using their respective domain specific language 170. The rules may be provided in plain text, speech-to-text, or some other format. The rules may also be provided through a graphical user interface, wherein the rules may be constructed using elements of the DSL 170.

The domain module 160 can support inputs using the domain specific language 170 for defining rules within the rule implementation system 120. Each given domain may be associated with its own domain specific language 170. Because the domain specific language 170 may be oriented toward users within a particular domain, and may be generally quite specific to that domain, the domain experts generally do not need to be familiar with operational details of the complex event handler 110 or the rule implementation system 120 to provide inputs using the domain specific language 170. A condition generator functionality associated with the domain module 160 may process inputs expressed in the domain specific language 170 to generate a rule condition. Such inputs may be processed into a rule formatted in a fashion that simplifies insertion as a rule into the rule implementation system 120. Similarly, an action generator functionality associated with the domain module 160 may process inputs expressed in the domain specific language 170 to extract resultant actions associated with the rule being triggered within the rule implementation system 120.

Figure 5:
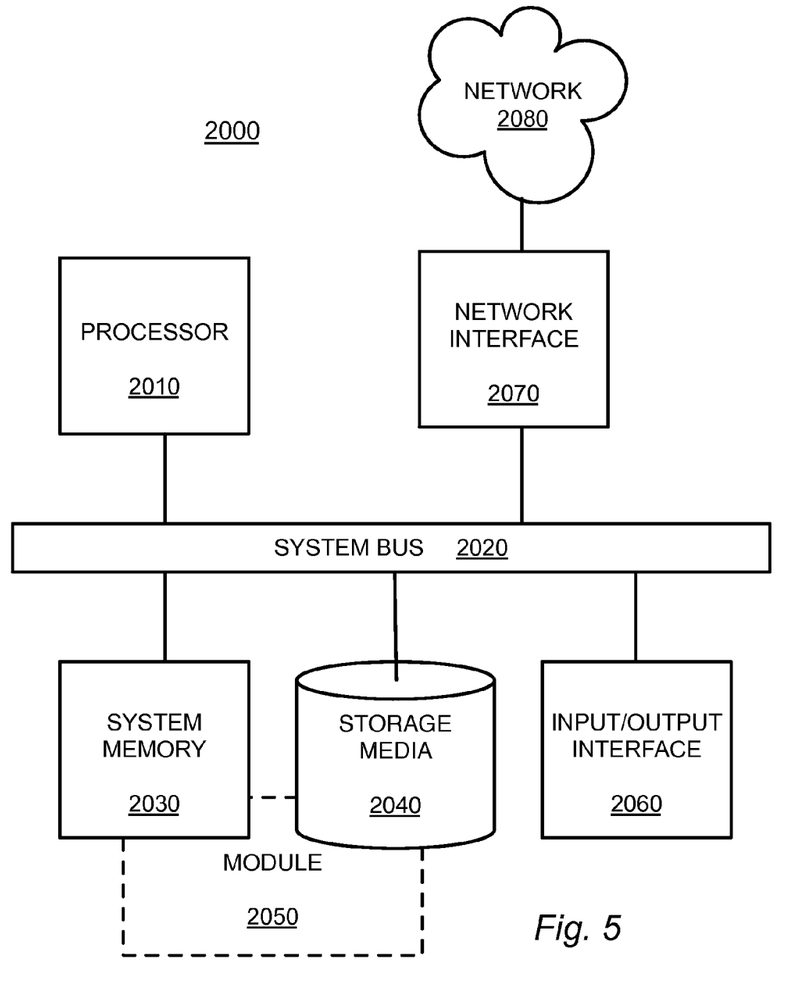
FIG. 5 is a block diagram depicting a computing machine and a module in accordance with one or more embodiments presented herein.

The complex event handler 110, the rule implementation system 120, systems associated with the event generators 150, systems associated with the domain module 160, systems associated with the resultant events and actions 180, or any other systems associated with the technology presented herein may be any type of computing machine such as, but not limited to, those discussed in more detail with respect to FIG. 5. Furthermore, any modules (such as the complex event handler module 140, or the domain module 160) associated with any of these computing machines or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks such as the network technology discussed with respect to FIG. 5.

Figure 2:
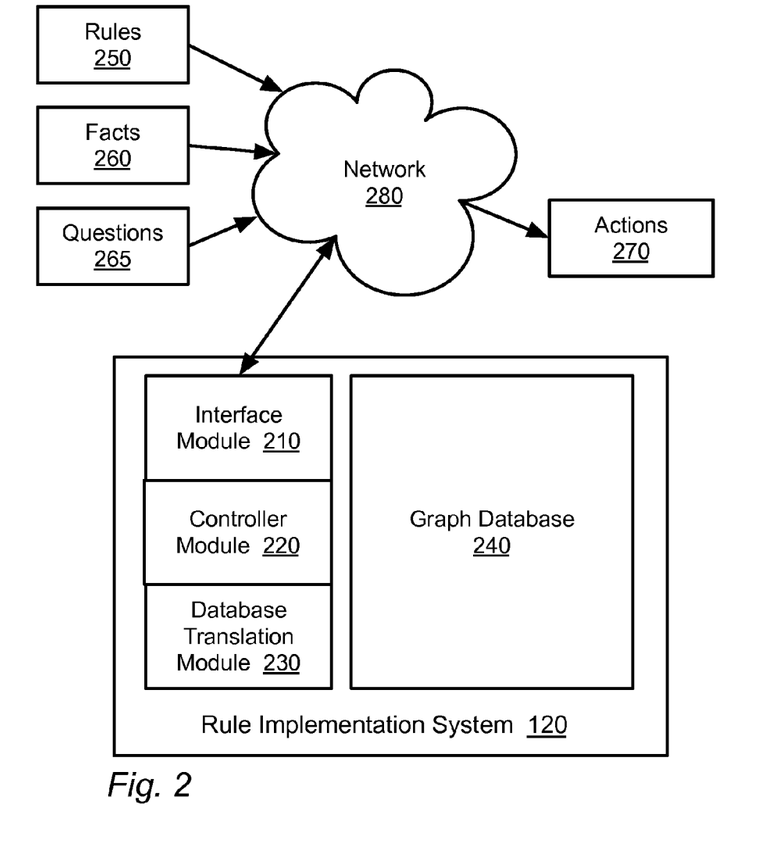
FIG. 2 is a block diagram depicting a rule implementation system associated with a graph database in accordance with one or more embodiments presented herein.

FIG. 2 is a block diagram depicting a rule implementation system 120 associated with a graph database 240 in accordance with one or more embodiments presented herein. This example rule implementation system 120 can operate within the complex event handler 110 to match incoming and prior events to trigger resultant events and actions 180. The rule implementation system 120 can operate on rules 250 and facts 260 to respond to questions 265 or to establish additional rules 250, additional facts 260, or trigger actions 270. It should be appreciated that in this context, the facts 260 may be incoming and prior events associated with the complex event handler 110. The rule implementation system 120 can include various modules such as an interface module 210, a controller module 220, and a database translation module 230. The rule implementation system 120 can operate directly within, or in conjunction with, a graph database 240. Rules 250, facts 260, questions 265 or actions 270 associated with the rule implementation system 120 may be communicated directly to or from the rule implementation system 120. These communications may also occur in conjunction with one or more networks 280.

A rule 250 associated with the rule implementation system 120 generally consists of two components: a condition and a result. The condition and result of a rule 250 may be said to have an "if, then" relationship. If the condition obtains, then the rule 250 is triggered causing the result to be fired. The condition generally obtains by the existence, or truth, of one or more facts 260. For example, a condition could be, "if it is Wednesday," which would trigger when presented with the fact that the day of the week is Wednesday. The result of firing a rule 250 generally involves one or more other facts 260 or the generation of an action 270. Firing of the rule 250 can assert or retract one or more other facts 260. Firing of the rule 250 can also generate one or more actions 270 as output of the rule implementation system 120. Asserting or retracting one or more facts 260 can alter the state of the rule implementation system 120, which may then affect the conditions of other rules 250 causing them to fire. Altering the state of the rule implementation system 120 may also affect the responses provided to questions 265 processed by the rule implementation system 120.

The graph database 240 can provide the working memory of the rule implementation system 120. This working memory can store information comprising the current state or knowledge of the rule implementation system 120. The graph database 240 can store information in a graph structure where nodes are interconnected by edges. The nodes generally represent entities or things such as individuals, departments, or equipment. Edges generally connect nodes representing the relationship between them. Each node may be associated with one or more properties, which may contain information pertinent to that respective node.

The interface module 210 of the rule implementation system 120 can provide an application programming interface (API), scripting interface, domain-specific language (DSL) 170, or other mechanism for interfacing to the rule implementation system 120. The interface module 210 may support transactions with other modules, systems, or entities associated with the rule implementation system 120. These transactions may involve providing rules 250 or facts 260 to the rule implementation system 120, receiving and reacting to questions 265, retrieving rules 250 or facts 260 from the rule implementation system 120, or receiving actions 270 or information associated with actions 270 from the rule implementation system 120.

The controller module 220 of the rule implementation system 120 can process control operations of the rule implementation system 120. Examples of the operations may include executing queries, starting/stopping rule evaluation, and so forth.

The database translation module 230 of the rule implementation system 120 can provide low-level interactions with the graph database 240. These interactions may include performing queries, handling fact node assertion or retraction, database administrative tasks, and so forth.

It should be appreciated that in addition to the interface module 210, controller module 220, database translation module 230, and graph database 240, the rule implementation system 120 may include or interface with other modules. It should also be appreciated that any two or more of these modules may be combined into the same module or modules. Furthermore, any one or more of these modules may split functionally, or load share, between two or more modules or execute on two or more computing machines. Any such modules may operate in a parallel, distributed, or networked fashion without departing from the spirit or scope of the technology presented herein.

Within the rule implementation system 120, a rule-fact graph may be a graph stored in the graph database 240. The rule-fact graph can include various nodes connected by edges. The rule-fact graph within the graph database 240 can serve as the working memory of the rule implementation system 120. This working memory can store information comprising the current state or knowledge of the rule implementation system 120. This information can include various facts 260, which may be stored as nodes connected by edges representing relationships between the nodes such that the nodes and edges together can encode the rules 250.

Within the rule implementation system 120, rule interpretation may be provided by executing queries on the rule-fact graph within the graph database 240. The queries may be associated with questions 265 posed to the rule implementation system 120. The queries and questions 265 may relate to incoming and prior events. The queries can pattern-match facts 260 against the encoded rules 250 determining which of the rules 250 to apply. The condition portion of each rule 250 may be tested against the current state of the working memory by pattern matching against the rule-fact graph. The consequent results can update the knowledge represented by the rule-fact graph by asserting or retracting information. The consequent results can also update the event knowledge by generating an event that will in turn be stored to the event log 130. Rule interpretation can execute forward chaining when updated information affects other rules 250 implied within the rule-fact graph. The results consequent to the condition can also trigger actions 270 which may include generating new events. Queries of the rule-fact graph within the graph database 240 can leverage a schema-free storage structure supporting index-free adjacency where any node may be directly linked (by one or more edges) to its adjacent nodes such that index lookups are unnecessary.

Within the rule implementation system 120, representing rules 250 within the graph database 240 provides the ability to establish adjacencies between any nodes (and thus relationships between facts 260) without having to rebuild schemas or introduce associating tags or indices. Accordingly, rules 250 may be changed or introduced anew within the rule-fact graph very efficiently and with reduced effort or overhead. Changing this rule representation in a traditional database for a huge number of entries can be extremely time consuming and nearly impossible, if such rules changed as frequently as they might in certain complex enterprise environments such as health care information systems.

Some example benefits to the rule implementation system 120 leveraging the graph database 240 relate to it being more suitable for managing ad hoc and changing data with evolving schemas. For example, in a healthcare enterprise such as a hospital department, the number of nurses may vary from shift to shift, as might the number of patients. Furthermore, the roles of the nurses may change and the assignments relating the nurses to specific patients may also change. When additional facts 260 and rules 250 associated with the hospital department come into play, the rule-fact graph can quickly become very large even while being dynamic (rapidly changing). For example, the additional events, facts 260, and rules 250 may relate to procedures, medications, food service, radiology, tests, specialist referrals, admit/discharges, code emergencies, monitoring alarms, and so forth. Other example additional events, facts 260, and rules 250 may relate to routing messages, alarms, notifications, voice calls, text messages, or other communication modalities to one or more nurses (or wireless mobile devices associated therewith) within a healthcare enterprise. This type of information is also well addressed by the schemaless structure support of the rule implementation system 120 and its associated graph database 240.

Another example benefit to the rule implementation system 120 leveraging the graph database 240 stems from the native pattern matching capabilities of the graph database 240. Such native pattern matching support can provide for significant increases in efficiencies related to rule interpretation and associated queries.

Yet another example benefit to the rule implementation system 120 leveraging the graph database 240 relates to the disk-backed performance of the rule implementation system 120 and its associated graph database 240. Disk-backed operation can provide persistence of state by maintain information within the graph database 240. Disk-backed operation can also overcome working memory limitations encountered in operating on a rule-fact graph of ever increasing size and complexity. It should be appreciated that this "working knowledge" associated with the rule-fact graph maintains rules and is in contrast to the prior event knowledge stored in the event log 130.

The rule implementation system 120, systems associated with the rules 250, facts 260, or actions 270, systems associated with the graph database 240, or any other systems associated with the technology presented herein may be any type of computing machine such as, but not limited to, those discussed in more detail with respect to FIG. 5. Furthermore, any modules (such as the interface module 210, controller module 220, or database translation module 230) associated with any of these computing machines or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks such as network 280. The network 280 may include any type of data or communications network including any of the network technology discussed with respect to FIG. 5.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 3:
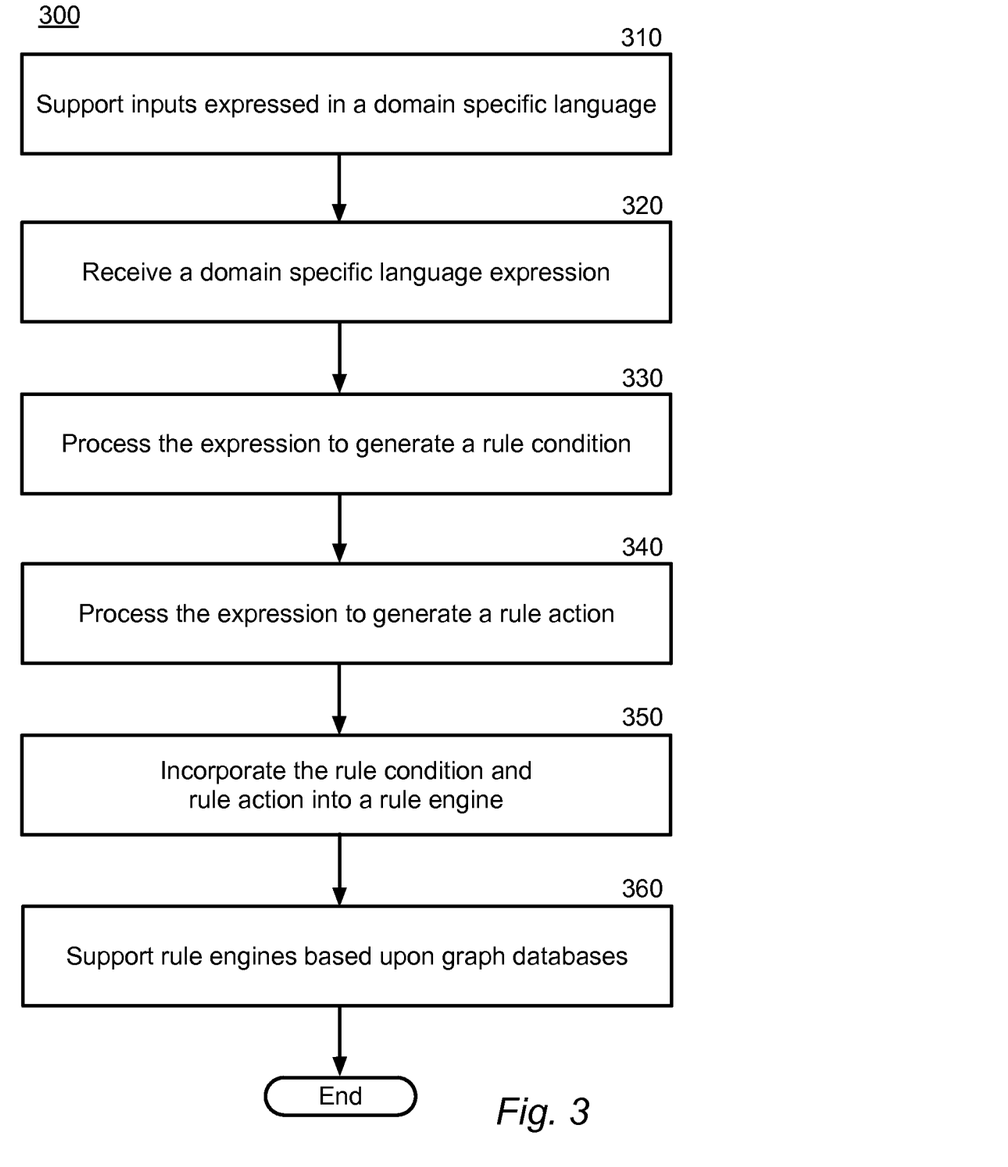
FIG. 3 is a block flow diagram depicting a method for providing domain specific rules for complex event handling in accordance with one or more embodiments presented herein.

FIG. 3 is a block flow diagram depicting a method 300 for providing domain specific rules for complex event handling in accordance with one or more embodiments presented herein.

In block 310, a domain module 160 can support applying knowledge from domain experts into complex event handler 110. Leveraging a DSL 170 associated with a domain module 160, rules 250 may be implemented within the rule implementation system 120 by domain experts. The domain experts may use jargon or terminology specific to their specific domain of expertise. Certain example domains, within a healthcare context, may include pharmacy, radiology, skilled nursing, cardiology, and so forth.

In block 320, the domain module 160 can receive an expression provided by a domain user in a domain specific language 170. The domain user may provide the input as a text expression or an assemblage of textual elements selected according to a graphical user interface. The domain user may also provide the input as an audible voice instruction that may be converted to a textual input.

In block 330, the domain module 160 can process the received expression to extract a rule condition. The rule condition may be a function of any number of present events, any number of prior events, or a combination thereof. The received expression may be processed according to structures, definitions, and syntax of the domain specific language 170. For example, a domain specific language 170 associated with the domain of pharmacy may specify language structures and syntaxes for times and dosages of pharmaceutical prescriptions. Applying these structures to the provided expression can support the appropriate extraction of the rule condition intended by the domain user providing the input.

In block 340, the domain module 160 can process the received expression to extract a rule action 270. The rule action 270 may be associated with a rule condition. The rule action 270 may be executed when the associated rule condition is triggered. The received expression may be processed according to structures, definitions, and syntax of the domain specific language 170. For example, a domain specific language 170 associated with the domain of pharmacy may specify language structures and syntaxes for times and dosages of pharmaceutical prescriptions. Applying these structures to the provided expression can support the appropriate extraction of the rule action 270 intended by the domain user providing the input.

In block 350, the rule condition and the rule action 270 can be incorporated into the rule implementation system 120 as a new rule 250. The rule condition of the new rule 250 may be a function of incoming and/or stored events. When the rule implementation system 120 matches incoming and/or stored events to the rule condition, the rule action 270 of the new rule 250 may be triggered.

In block 360, the complex event handler 110 can support leveraging a rule implementation system 120 associated with a graph database 240. The rule implementation system 120 can convert a received rule 250 to a format suitable for insertion into the graph database 240. For example, the rule 250 may be converted to one or more nodes and one or more edges. The database translation module 230 of the rule implementation system 120 can insert the converted rule 250 into the graph database 240. Rules 250 may be inserted by adding one or more nodes to the graph database 240 and then forming one or more edges between newly inserted nodes or existing nodes. These edges can establish relationships between the nodes, which may represent facts 260. For example, the rule "all ravens are black," might be represented in the graph database 240 by creating nodes for "ravens" and "black" followed by connecting those nodes with an edge having the property or implication of "is" or "are." Were this same example rule received while nodes for "ravens" and "black" already in existence, then the rule may be entered by merely forming the relationship edge between those two nodes.

Figure 4:
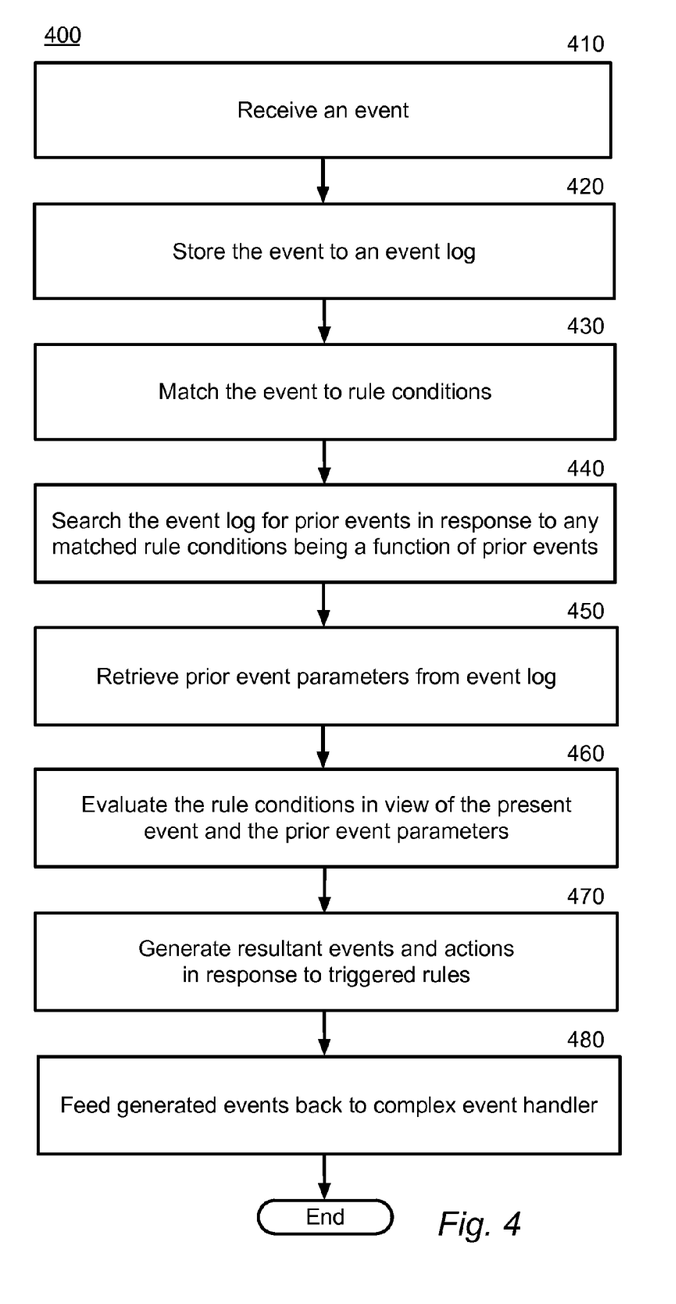
FIG. 4 is a block flow diagram depicting a method for complex event handling in accordance with one or more embodiments presented herein.

FIG. 4 is a block flow diagram depicting a method 400 for complex event handling in accordance with one or more embodiments presented herein. In block 410, the complex event handler 110 can receive an event. The event may be a current incoming event arriving from an event generator 150.

In block 420, the complex event handler 110 can store the received event to the event log 130. The event log 130 can maintain stored events to be queried for future rule testing. A time/date stamp and other identifiers may be applied to the events that are entered into the event log 130.

In block 430, the received event may be matched to rule conditions associated with the rule implementation system 120. A rule 250 with a condition matching the received event may be triggered by the rule implementation system 120. A rule 250 with a condition matching the received event but also depending upon one or more stored events may cause the event log 130 to be searched for those stored events. Accordingly the rule condition may be tested against the incoming events and the relevant stored events.

In block 440, the event log 130 may be searched for prior events in response to a matched rule condition being a function of prior events. A rule 250 with a condition matching the received event but also depending upon one or more stored events may cause the event log 130 to be searched for those stored events. Accordingly the rule condition may be tested against the incoming events and the relevant stored events.

In block 450, event parameters may be retrieved from the event log 130. Stored events that were identified by the search discussed with respect to block 440 may be retrieved from the event log 130. Parameters associated with the stored events being retrieved may also be retrieved form the event log 130. For example, if the identified stored event relates to a patient alarm, parameters may include a patient identifier, what system generated the alarm, which clinicians were notified of the alarm, when the alarm occurred, and so forth. The rule 250 having the condition that is dependent upon the identified stored event may be further evaluated in light of the retrieved event and its associated parameters as necessary.

In block 460, the rule condition that was matched by the received event may be evaluated in view of the presently received events, the prior event(s) retrieved from the event log 130, and the parameters associated with the prior event(s). The rule implementation system 120 can evaluate the received event(s), the prior event(s), and any associated parameters against the rule 250 as though they were facts 260 or questions 265 to match against the rule condition.

In block 470, rule implementation system 120 can generate resultant events and actions 180 in response to triggered rules. When, the rule implementation system 120 matches a rule 250 with the received event(s), necessary prior event(s), and any associated parameters, the rule 250 may be said to have triggered. Triggering a rule 250 may generate resultant events and actions 180.

In block 480, generated events can be fed back into the complex event handler 110. These events that have been fed back into the complex event handler 110 may be stored and processed just as any other received event.

Example Systems

FIG. 5 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for complex event handling, comprising:
    providing, within a complex event handling system, a rule implementation system comprising an interface to a graph database for storing rules and facts;
    providing, separately from the rule implementation system, an event log comprising a history of past events and associated prior event parameters for future rule testing;
    receiving, by the rule implementation system, a rule comprising a rule condition and a rule result such that when the rule condition obtains, the rule is triggered causing the rule result to be executed;
    analyzing, by the rule implementation system, the rule condition to extract two or more condition entities and one or more condition relationships;
    converting, by the rule implementation system, the received rule condition to a condition graph comprising two or more nodes representing the two or more condition entities, and one or more edges representing the condition relationships;
    analyzing, by the rule implementation system, the rule result to extract one or more result entities and one or more result actions;
    converting, by the rule implementation system, the rule result into a result graph comprising one or more nodes representing the one or more result entities;
    inserting, by the rule implementation system, edges representing the result actions to connect the condition graph and the result graph to form a rule graph;
    storing, by the rule implementation system, the rule graph into the graph database;
    receiving, by the complex event handling system, a current event;
    identifying, by the complex event handling system, one or more rule graphs, within the rule implementation system, wherein the respective identified condition graph associated with each of the one or more rule graphs comprises condition entities associated with both the current event and a past occurrence of a particular prior event;
    searching, by the complex event handling system, the event log for the particular prior event;
    retrieving, by the complex event handling system, prior event parameters, from the event log, corresponding to the particular prior event;
    performing, by the rule implementation system, a query against the graph database to evaluate the identified condition graph in response to both the current event and the retrieved prior event parameters; and
    executing, by the rule implementation system, the associated result actions upon the result graph associated with the identified condition graph in response to the performed query.

2. The computer-implemented method of claim 1, wherein the current event comprises communications within a healthcare enterprise.

3. The computer-implemented method of claim 1, wherein the actions comprise communications within a healthcare enterprise.

4. The computer-implemented method of claim 1, further comprising generating an event that is fed back into the complex event handler.

5. The computer-implemented method of claim 1, wherein the rule implementation system leverages native pattern matching capabilities associated with the graph database.

6. The computer-implemented method of claim 1, further comprising receiving a domain specific language expression, processing the domain specific language expression to generate a new rule condition, processing the domain specific language expression to generate a new rule action, and incorporating the new rule condition and the new rule action into the rule implementation system.

7. The computer-implemented method of claim 1, wherein the prior event parameters comprise time/date stamps.

8. The computer-implemented method of claim 1, wherein the event log comprises a database of prior received events.

9. The computer-implemented method of claim 1, wherein prior received events stored within the event log are removed from the event log after a specified duration of time.

10. The computer-implemented method of claim 1, wherein matching the current event against rule conditions within the rule implementation system leverages native pattern matching capabilities associated with the graph database.

11. A complex event handling system, comprising:
one or more processing units, and one or more processing modules, wherein the complex event handling system is configured by the one or more processing modules to:
provide, within the complex event handling system, a rule implementation system comprising an interface to a graph database for storing rules and facts;
provide, separately from the rule implementation system, an event log comprising a history of past events and associated prior event parameters for future rule testing;
receive a rule comprising a rule condition and a rule result such that when the rule condition obtains, the rule is triggered causing the rule result to be executed;
analyze the rule condition to extract two or more condition entities and one or more condition relationships;
convert the received rule condition to a condition graph comprising two or more nodes representing the two or more condition entities, and one or more edges representing the condition relationships;
analyze the rule result to extract one or more result entities and one or more result actions;
convert the rule result into a result graph comprising one or more nodes representing the one or more result entities;
insert edges representing the result actions to connect the condition graph and the result graph to form a rule graph;
store the rule graph into the graph database;
receive a current event;
identify one or more rule graphs, within the rule implementation system, wherein the respective identified condition graph associated with each of the one or more rule graphs comprises condition entities associated with both the current event and a past occurrence of a particular prior event;
retrieve prior event parameters, from the event log, corresponding to the particular prior event;
perform a query against the graph database to evaluate the identified condition graph in response to both the current event and the retrieved prior event parameters; and
execute the associated result actions upon the result graph associated with the identified condition graph in response to the performed query.

12. The complex event handling system of claim 11, wherein the complex event handling system is further configured to receive a domain specific language expression, process the domain specific language expression to generate a new rule condition, process the domain specific language expression to generate a new rule action, and incorporate the new rule condition and the new rule action into the rule implementation system.

13. The complex event handling system of claim 11, wherein the complex event handling system is further configured to generate an event that is fed back into the complex event handling system.

14. The complex event handling system of claim 11, wherein the current event comprises a communication within a healthcare enterprise.

15. The complex event handling system of claim 11, wherein the actions comprise communications within a healthcare enterprise.

16. The complex event handling system of claim 11, wherein the graph database operates in support of a healthcare enterprise.

17. The complex event handling system of claim 11, wherein the rule implementation system leverages native pattern matching capabilities of the graph database.

18. The complex event handling system of claim 11, wherein the event log comprises a database of prior received events.

19. The complex event handling system of claim 11, wherein the prior event parameters comprise time/date stamps.

20. A computer program product, comprising:
a non-transitory computer-readable storage medium having computer-readable program code embodied therein that, when executed by one or more computing devices, perform a method comprising:
providing, within a complex event handling system, a rule implementation system comprising a working memory, wherein rules associated with the rule implementation system are represented within a graph database;
providing, separately from the rule implementation system and the working memory, an event log comprising a history of past events and associated prior event parameters for future rule testing;
receiving a domain specific language expression from a domain user;
processing the domain specific language expression to generate a new rule condition comprising two or more condition entities and one or more condition relationships;
processing the domain specific language expression to generate a new rule action comprising one or more result entities and one or more result actions;

converting the new rule condition to a condition graph comprising two or more nodes representing the two or more condition entities, and one or more edges representing the condition relationships;

converting the rule action into a result graph comprising one or more nodes representing the one or more result entities;

inserting edges representing the result actions to connect the condition graph and the result graph to form a rule graph;

incorporating the rule graph into the graph database associated with the rule implementation system;

receiving, into a complex event handling system, a current event;

storing the current event to the event log;

matching the current event against rule conditions within the rule implementation system by querying the graph database;

identifying one or more rule graphs, within the rule implementation system, wherein associated condition graphs comprise both the current event and a past occurrence of a particular prior event;

searching the event log for the particular prior event;

retrieving prior event parameters, from the event log, corresponding to the particular prior event;

evaluating the condition graphs in view of the current event and the retrieved prior event parameters;

executing associated result actions upon the result graph associated with the identified condition graph in response to the evaluating; and generating an new event that is fed back into the complex event handling system.

* * * * *